US011063831B2

(12) United States Patent
Xu et al.

(10) Patent No.: US 11,063,831 B2
(45) Date of Patent: Jul. 13, 2021

(54) NETWORK SLICE MANAGEMENT METHOD AND APPARATUS

(71) Applicant: Huawei Technologies Co., Ltd., Shenzhen (CN)

(72) Inventors: Ruiyue Xu, Shanghai (CN); Yan Li, Shanghai (CN); Kai Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/573,509

(22) Filed: Sep. 17, 2019

(65) Prior Publication Data
US 2020/0052969 A1 Feb. 13, 2020

Related U.S. Application Data

(63) Continuation of application No. PCT/CN2018/078730, filed on Mar. 12, 2018.

(30) Foreign Application Priority Data

Mar. 18, 2017 (CN) .......................... 201710162500.9

(51) Int. Cl.
*H04L 12/24* (2006.01)
(52) U.S. Cl.
CPC ...... *H04L 41/0893* (2013.01); *H04L 41/0813* (2013.01); *H04L 41/5019* (2013.01); *H04L 41/5048* (2013.01)
(58) Field of Classification Search
CPC ............. H04L 41/0893; H04L 41/0813; H04L 41/5019; H04L 41/5048; H04L 41/0806;
(Continued)

(56) References Cited

U.S. PATENT DOCUMENTS 9,276,816 B1 *  3/2016  Conte ..................... H04L 41/12
10,567,440 B2 *  2/2020  Bansal ................. H04L 63/205
(Continued)

FOREIGN PATENT DOCUMENTS

| CN | 104125091 A | 10/2014 |
| CN | 106341832 A | 1/2017 |
| CN | 106792692 A | 5/2017 |

OTHER PUBLICATIONS

B. Chatras, U. S. Tsang Kwong and N. Bihannic, "NFV enabling network slicing for 5G," 2017 20th Conference on Innovations in Clouds, Internet and Networks (ICIN), Paris, France, Conference date Mar. 7-9, 2017, pp. 219-225, doi: 10.1109/ICIN.2017.7899415. (Year: 2017).*

(Continued)

*Primary Examiner* — Mohamed A. Wasel
*Assistant Examiner* — Rachel J Hackenberg
(74) *Attorney, Agent, or Firm* — Slater Matsil, LLP

(57) ABSTRACT

This application provides a network slice management method and apparatus. A first manager obtains capability information of a subnet, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance; and then generates information about a network slice based on the capability information of the subnet, where the information about the network slice includes information about a network slice template or information about a network slice instance, and the network slice includes at least one subnet.

21 Claims, 6 Drawing Sheets

(58) Field of Classification Search
CPC ............... H04L 41/084; H04L 41/0823; H04L 41/5051; H04L 41/5054; H04L 41/0886; H04L 41/5003; H04L 41/5041; H04L 41/5022; H04L 41/5045; H04L 41/5058
See application file for complete search history.

(56) References Cited

U.S. PATENT DOCUMENTS

| | | | |
|---|---|---|---|
| 2013/0339495 A1* | 12/2013 | Mower | H04L 41/0803 709/220 |
| 2016/0006623 A1* | 1/2016 | Liu | H04L 43/0876 370/254 |
| 2017/0054595 A1 | 2/2017 | Zhang et al. | |
| 2017/0070892 A1* | 3/2017 | Song | H04W 48/20 |
| 2018/0270820 A1* | 9/2018 | Gupta | H04W 4/70 |
| 2019/0238425 A1* | 8/2019 | Mladin | H04L 41/5048 |
| 2019/0386878 A1* | 12/2019 | Chou | H04W 4/50 |
| 2020/0044919 A1* | 2/2020 | Yao | H04L 41/0806 |

OTHER PUBLICATIONS

Qi, A. et al., "Network slicing architecture based on SDN and NFV," Published in Telecommunications Science, Nov. 2016 (with English abstract), 8 pages.

Huawei, "Add potential solution for creating a network slice instance to support a communication service," 3GPP TSG SA WG5 (Telecom Management) Meeting #111 Bis, S5A-170115, Feb. 13-17, 2017, Munich, Germany, 2 pages.

3rd Generation Partnership Project; Technical Specification Group Services and System Aspects; Telecommunication management; Study on management and orchestration of network slicing for next generation network (Release 14), 3GPP TR 28.801 V1.0.0 (Mar. 2017), 52 pages.

* cited by examiner

NETWORK SLICE MANAGEMENT METHOD AND APPARATUS

CROSS-REFERENCE TO RELATED APPLICATIONS

This application is a continuation of International Application No. PCT/CN2018/078730, filed on Mar. 12, 2018, which claims priority to Chinese Patent Application No. 201710162500.9, filed on Mar. 18, 2017. The disclosures of the aforementioned applications are hereby incorporated by reference in their entireties.

TECHNICAL FIELD

This application relates to the field of communications technologies, and in particular, to a network slice management method and apparatus.

BACKGROUND

Nowadays, network services are developing prosperously, the development including network development and network application development, and network virtualization further accelerates a development trend. A next generation network will be expanded to support different types of new customers and partners, and service diversity and automatic deployment are features of the next generation network. How to use existing network resources to quickly respond to service requirements of business to business (B2B) and business to customer (B2C), provide launch and provisioning of a new service in a timely manner, and reduce time to market (TTM) of a new service is main competitive pressure that an operator faces.

A network slice is an important technical means for a next generation network to meet special network requirements of different industries and different users. A network slice is communication resources ensuring that a carried service can meet a requirement on a service level agreement (SLA). Hard isolation (physical isolation) or soft isolation (logical isolation) may be performed on these resources based on different requirements. It may also be considered that a network slice is a combination of network functions and resources required for completing a service (or some services), and is a complete logical network. A next generation network is a cross-vendor network, that is, different components of a network slice may come from different vendors. For example, when an operator is to deploy a low-latency network slice to provide a virtual reality service, vendors A, B, and C are used to jointly provide the network slice. How to automatically orchestrate or online integrate different components of different vendors to form the network slice is a major difficulty in rapid automatic service deployment.

An existing service deployment process is as follows: A customer imposes a service requirement on an operator, and the operator determines a network requirement based on the service requirement, designs a corresponding network, imposes corresponding network or subnet requirements on various device vendors, negotiates with the device vendors to reach an agreement on required network resources, and designs, based on network resources provided by the device vendors, a corresponding service to satisfy the requirement of the customer. It can be learned that the existing service deployment is completed through manual negotiation and takes a relatively long time, a manually designed network slice cannot be reused, and a long negotiation process is required for each new service. This results in a waste of resources.

SUMMARY

This application provides a network slice management method and apparatus, so that information about a plurality of network slices can be generated based on capability information of a plurality of subnets, to meet a plurality of service requirements. The generated network slices can be reused, thereby improving resource utilization.

A first aspect of this application provides a network slice management method, including: obtaining, by a first manager, capability information of a subnet from a second manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance; and generating, by the first manager, information about a network slice based on the capability information of the subnet, where the information about the network slice includes information about a network slice template or information about a network slice instance, and the network slice includes at least one subnet.

The first manager can generate information about a plurality of network slices based on capability information of a plurality of subnets, to meet a plurality of service requirements. The generated network slices can be reused, and physical implementation of the network slices is shielded externally.

When the information about the network slice includes the information about the network slice template, after the generating, by the first manager, information about a network slice based on the capability information of the subnet, the method further includes: sending, by the first manager, the information about the network slice template to a third manager.

Optionally, the information about the network slice instance includes requirement information of a subnet instance required for instantiation or creation of the network slice instance, and before the generating, by the first manager, information about a network slice based on the capability information of the subnet, the method further includes: receiving, by the first manager, requirement information of the network slice instance from a third manager, where the requirement information of the network slice instance is used for instantiation or creation of a network slice instance. Correspondingly, the generating, by the first manager, information about a network slice based on the capability information of the subnet is specifically: determining, by the first manager based on the requirement information of the network slice instance and the capability information of the subnet, the requirement information of the subnet instance required for instantiation or creation of the network slice instance.

Optionally, before the obtaining, by a first manager, capability information of a subnet from a second manager, the method further includes: sending, by the first manager, a query request message to the second manager, where the query request message is used to request for the capability information of the subnet.

A second aspect of this application provides a network slice management method, including: sending, by a second manager, capability information of a subnet to a first manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

Optionally, before the sending, by a second manager, capability information of a subnet to a first manager, the method further includes: generating, by the second manager, the capability information of the subnet.

Optionally, before the sending, by a second manager, capability information of a subnet to a first manager, the method further includes: receiving, by the second manager, a query request message sent by the first manager, where the query request message is used to request for the capability information of the subnet.

A third aspect of this application provides a network slice management apparatus, including: an obtaining module, configured to obtain capability information of a subnet from a second manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance; and a generation module, configured to generate information about a network slice based on the capability information of the subnet, where the information about the network slice includes information about a network slice template or information about a network slice instance, and the network slice includes at least one subnet.

Optionally, the information about the network slice includes the information about the network slice template. Correspondingly, the apparatus further includes: a sending module, configured to send the information about the network slice template to a third manager.

Optionally, the information about the network slice instance includes requirement information of a subnet instance required for instantiation or creation of the network slice instance. Correspondingly, the apparatus further includes: a receiving module, configured to receive requirement information of the network slice instance from a third manager, where the requirement information of the network slice instance is used for instantiation or creation of a network slice instance.

The generation module is specifically configured to: determine, based on the requirement information of the network slice instance and the capability information of the subnet, the requirement information of the subnet instance required for instantiation or creation of the network slice instance.

Optionally, the apparatus further includes: a sending module, configured to send a query request message to the second manager, where the query request message is used to request for the capability information of the subnet.

A fourth aspect of this application provides a network slice management apparatus, including: a sending module, configured to send capability information of a subnet to a first manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

Optionally, the apparatus further includes: a generation module, configured to generate the capability information of the subnet.

Optionally, the apparatus further includes: a receiving module, configured to receive a query request message sent by the first manager, where the query request message is used to request for the capability information of the subnet.

A fifth aspect of this application provides a network slice management apparatus, including a processor, a memory, and a communications interface. The memory is configured to store an instruction, the communications interface is configured to communicate with another device, and the processor is configured to execute the instruction stored in the memory, to perform the following method: obtaining capability information of a subnet from a second manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance; and generating information about a network slice based on the capability information of the subnet, where the information about the network slice includes information about a network slice template or information about a network slice instance, and the network slice includes at least one subnet.

Optionally, the information about the network slice includes the information about the network slice template. Correspondingly, the communications interface is configured to send the information about the network slice template to a third manager.

Optionally, the information about the network slice instance includes requirement information of a subnet instance required for instantiation or creation of the network slice instance, and before the generating, by the processor, information about a network slice based on the capability information of the subnet, the communications interface is further configured to receive requirement information of the network slice instance from a third manager, where the requirement information of the network slice instance is used for instantiation or creation of a network slice instance.

Correspondingly, the processor is specifically configured to determine, based on the requirement information of the network slice instance and the capability information of the subnet, the requirement information of the subnet instance required for instantiation or creation of the network slice instance.

Optionally, the communications interface is further configured to send a query request message to the second manager, where the query request message is used to request for the capability information of the subnet.

A sixth aspect of this application provides a network slice management apparatus, including a processor, a memory, and a communications interface. The memory is configured to store an instruction, the communications interface is configured to communicate with another device, and the processor is configured to execute the instruction stored in the memory. The communications interface is specifically configured to: send capability information of a subnet to a first manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

Optionally, the processor is specifically configured to generate the capability information of the subnet.

Optionally, the communications interface is further configured to receive a query request message sent by the first manager, where the query request message is used to request for the capability information of the subnet.

Optionally, in the first aspect to the sixth aspect of this application, the capability information of the subnet template includes at least one of the following: an identifier of the subnet template, a type of the subnet template, a function of the subnet template, a functional feature of the subnet template, a sharing policy of the subnet template, connection information of the subnet template, performance information of the subnet template, service information of the subnet template, and a configurable parameter of the subnet template.

Optionally, in the first aspect to the sixth aspect of this application, the capability information of the subnet instance includes at least one of the following: an identifier of the subnet instance, a type of the subnet instance, a function of the subnet instance, a functional feature of the subnet instance, a sharing policy of the subnet instance, performance information of the subnet instance, connection information of the subnet instance, and service information of the subnet instance.

Optionally, in the first aspect, the third aspect, and the fifth aspect of this application, the information about the network slice template includes capability information of at least one subnet template or capability information of at least one subnet instance, and the information about the network slice instance includes capability information of at least one subnet template or capability information of at least one subnet instance.

Optionally, in the first aspect, the third aspect, and the fifth aspect of this application, the information about the network slice template further includes at least one of the following information: indication information of the subnet instance, indication information of the subnet template, and a policy of resolution from the network slice corresponding to the network slice template to the subnet, the indication information of the subnet instance is used to indicate the subnet instance included in the network slice template, the indication information of the subnet template is used to indicate the subnet template included in the network slice template, and the network slice template is used to deploy the network slice instance.

A seventh aspect of this application provides a computer-readable storage medium, where the computer-readable storage medium stores an instruction. When the instruction is executed, a computer is enabled to perform the network slice management method according to the first aspect of this application.

An eighth aspect of this application provides a computer-readable storage medium, where the computer-readable storage medium stores an instruction. When the instruction is executed, a computer is enabled to perform the network slice management method according to the second aspect of this application.

A ninth aspect of this application provides a computer program product, where the computer program product includes an instruction. When the instruction is executed, a computer is enabled to perform the network slice management method according to the first aspect of this application.

A tenth aspect of this application provides a computer program product, where the computer program product includes an instruction. When the instruction is executed, a computer is enabled to perform the network slice management method according to the second aspect of this application.

According to the network slice management method and apparatus provided in this application, the first manager obtains the capability information of the subnet, where the capability information of the subnet includes the at least one of the following information: the capability information of the subnet template and the capability information of the subnet instance, the capability information of the subnet template is used to represent the feature of the subnet template, and the capability information of the subnet instance is used to represent the feature of the subnet instance; and then generates the information about the network slice based on the capability information of the subnet, where the information about the network slice includes the information about the network slice template or the information about the network slice instance, and the network slice includes the at least one subnet. According to the method, the first manager can generate the information about the plurality of network slices based on the capability information of the plurality of subnets, to meet the plurality of service requirements. The generated network slices can be reused, and the physical implementation of the network slices is shielded externally.

DETAILED DESCRIPTION OF ILLUSTRATIVE EMBODIMENTS

Network architectures and service scenarios described in this application are intended to describe technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

Figure 1:
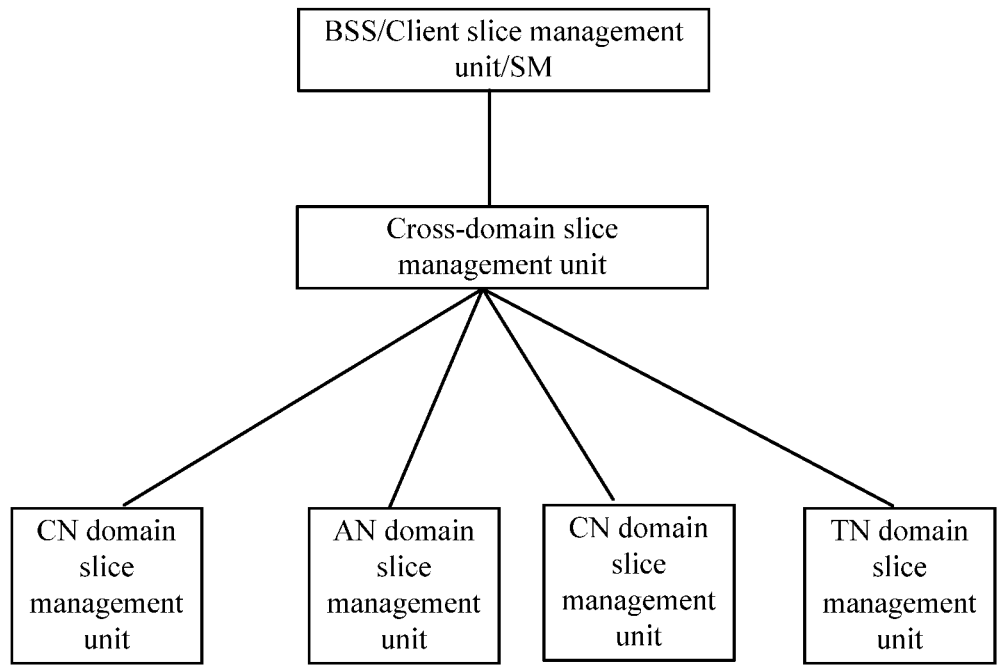
FIG. 1 is a possible architectural diagram of a network according to this application.

FIG. 1 shows a possible network architecture according to this application. The network architecture includes a business support system (BSS)/a client slice manager/a service manager (SM), a cross-domain slice manager, and a plurality of domain slice managers. At present, a network is mainly divided into three domains: an access network (AN) domain, a core network (CN) domain, and a transport network (TN) domain. Correspondingly, the plurality of domain slice managers include an AN domain slice manager, a CN domain slice manager, and a TN domain slice manager. The domain slice managers may also be referred to as domain subnet managers. Correspondingly, the AN domain slice manager is also referred to as an AN domain subnet manager, the CN domain slice manager is also referred to as a CN domain subnet manager, and the TN domain slice manager is also referred to as a TN domain subnet manager. The plurality of domain slice managers may come from different vendors. For example, in an example shown in FIG. 1, two CN domain slice managers are respectively provided by a provider 1 and a provider 2, an AN domain slice manager is provided by a provider 3, and a TN domain slice manager is provided by a provider 4.

The client slice manager is configured to manage a network slice that is rented from an operator network by a customer or a tenant.

The cross-domain slice manager is also referred to as a network slice manager or a network slice design unit, and includes at least one of the following functions: network slice management, mapping between a network slice, a subnet, and a network function, network slice orchestration, and coordination between network resources provided by different domains and sub-SLAs. In the following embodiments, a network slice may be communication resources ensuring that a carried service or a service can meet a requirement on an SLA, or may be considered as a combination of network functions and communication resources required for completing a service or some services. The network slice management includes network slice design, life cycle management, network slice template management, network slice fault management, network slice performance management, and network slice configuration management. The network slice orchestration means jointly orchestrating subnet slices and network functions provided by various domains, to obtain a network slice meeting a service requirement. The service requirement may be a requirement on an SLA, a requirement on a key performance indicator (KPI), or a requirement on quality of service (QoS).

The domain slice manager, also referred to as a subnet manager or a subnet design unit, is mainly used for subnet management, subnet service management, and coordination and orchestration of network resources of a subnet. The subnet management includes subnet design, life cycle management (creation, update, deletion, and the like), subnet fault management, subnet performance management, subnet configuration management, and the like. The subnet service management includes service life cycle management, service fault management, service performance management, service configuration management, and the like.

Specifically, the CN domain slice manager is mainly used for CN subnet management, CN subnet service management, and coordination and orchestration of network resources of a CN subnet. The CN subnet management includes CN subnet design, life cycle management (creation, update, deletion, and the like), CN subnet fault management, CN subnet performance management, CN subnet configuration management, and the like. The CN subnet service management includes service life cycle management, service fault management, service performance management, service configuration management, and the like.

The AN domain slice manager is mainly used for AN subnet management, AN subnet service management, and coordination and orchestration of network resources of an AN subnet. The AN subnet management includes AN subnet design, life cycle management (creation, update, deletion, and the like), AN subnet fault management, AN subnet performance management, AN subnet configuration management, and the like. The AN subnet service management includes service life cycle management, service fault management, service performance management, service configuration management, and the like.

The TN domain slice manager is mainly used for TN subnet management, TN subnet service management, and coordination and orchestration of network resources of a TN subnet. The TN subnet management includes TN subnet design, life cycle management (creation, update, deletion, and the like), TN subnet fault management, TN subnet performance management, TN subnet configuration management, and the like. The TN subnet service management includes service life cycle management, service fault management, service performance management, service configuration management, and the like.

Figure 2:
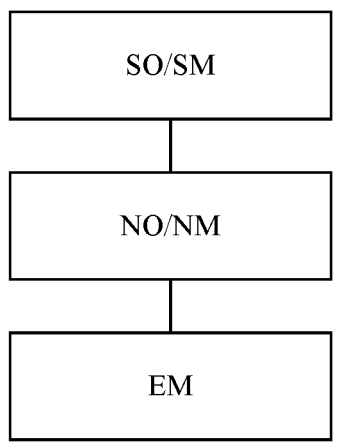
FIG. 2 is a schematic diagram of an existing network architecture.

The aforementioned cross-domain slice manager and domain slice managers may be integrated into an existing network element, or may exist as independent network elements. FIG. 2 is a schematic diagram of an existing network architecture. The network architecture includes the following network elements: a service orchestration (SO) unit, a network orchestration (NO) unit, and a network element management (EM) unit. The service orchestration unit may also be referred to as a service management (SM) unit, and the network orchestration unit is also referred to as a network management (NM) unit.

For ease of description, in the following, the service orchestration unit may be described as an SO unit or an SO, and the network orchestration unit may be described as an NO unit or an NO. In this application, the SO may be configured as an independent functional entity, or the SO may be configured as a functional module of another functional entity, or functions of the SO may be integrated into another functional entity. Similarly, in this application, the NO may be configured as an independent functional entity, or the NO may be configured as a functional module of another functional entity, or functions of the NO may be integrated into another functional entity. Further, the SO and the NO may be integrated into an integrated entity. The integrated entity has the functions of the SO and the functions of the NO. For example, the integrated entity may be referred to as a service and network orchestration unit. It can be understood that the integrated entity may alternatively have another name, and this is not limited in this application. Similarly, in the case of the integrated entity, in this application, the integrated entity may be configured as an independent functional entity, or the integrated entity may be configured as a functional module of another functional entity, or functions of the integrated entity may be integrated into another functional entity.

The functions of the foregoing SO include but are not limited to: service life cycle management (for example, instantiation or creation, and scale-out/in or update) based on a service request message sent by the BSS, service aggregation, service management (for example, fault, configuration, accounting, performance, security (Fault, Configuration, Accounting, Performance, Security, FCAPS) management), and mapping between a service and a network slice. The service may be a communications service, for example, a mobile broadband (MBB) service, such as voice and internet of things (IOT) services (for example, intelligent parking and smart metering), that is of a specified service level agreement (SLA) and that can be enjoyed by a group of users.

The functions of the foregoing NO include but are not limited to: network slice management (for example, life cycle management, FCAPS management, and network slice template management); network function (NF) management; mapping between a network slice and a network function; coordination between network resources of different types; coordination between network resources provided by different operators and different network providers; joint orchestration of network devices provided by different providers, so that the network resources provided by the different network providers can meet a requirement (for example, a requirement on an SLA, a requirement on a key performance indicator (KPI), or a requirement on quality of service (QoS)) of a target service; and externally providing an application programming interface (API). The API interface is used to provide a network function for a third party to implement cross-operator deployment.

For example, both the SO and the NO may be disposed in an operations support system (OSS)/the business support system (BSS). The SO and the NO may be alternatively disposed in another manner. For example, both the SO and the NO are disposed outside the OSS/BSS. For another example, the SO is disposed in the OSS/BSS, and the NO is disposed outside the OSS/BSS. Alternatively, the SO and the NO may be integrated into an integrated entity, and the integrated entity may be disposed in the OSS/BSS or outside the OSS/BSS.

It should be noted that the cross-domain slice manager may be the foregoing SO, NO, or NM, and each domain slice or subnet manager may also be the SO, the NO, the EM, a Domain Manager (DM), or the NM.

The following describes the technical solutions in this application based on the foregoing common aspects of this application.

On a basis of the foregoing network architecture, in the solutions of this application, network slice management may be performed through interaction between a first manager and a second manager. The first manager is mainly configured to design a network slice template or orchestrate a network slice instance based on capability information of a subnet template or a subnet instance. The second manager is mainly configured to report the capability information of the subnet template or the subnet instance to the first manager. It can be understood that any device that can design a network slice template or orchestrate a network slice instance based on capability information of a subnet template or a subnet instance may be referred to as a first manager; and similarly, any device that reports capability information of a subnet template or a subnet instance to the first manager may be referred to as a second manager.

Figure 3:
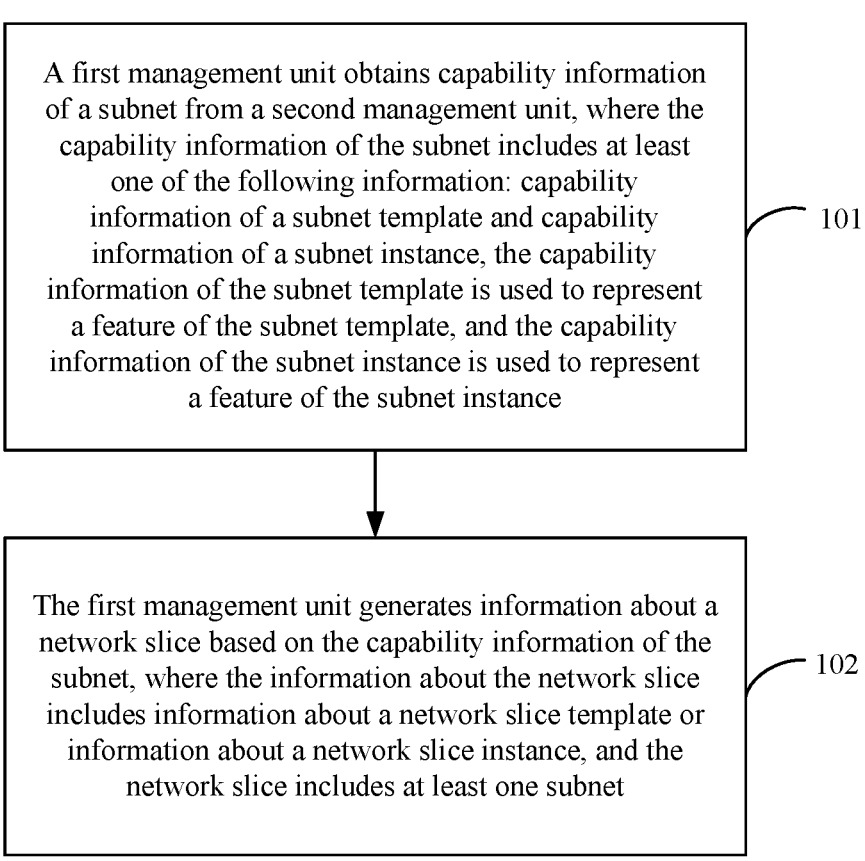
FIG. 3 is a schematic flowchart of a network slice management method according to Embodiment 1.

Embodiment 1 of this application provides a network slice management method. FIG. 3 is a schematic flowchart of the network slice management method according to Embodiment 1. As shown in FIG. 3, the method in this embodiment includes the following steps.

Step 101: A first manager obtains capability information of a subnet from a second manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

The first manager may obtain capability information of one or more subnets. The capability information of the subnet includes the at least one of the following information: the capability information of the subnet template and the capability information of the subnet instance. The subnet template is used to describe information about the subnet, the subnet template is used to deploy the subnet instance, and the subnet instance is used to represent a specific logical network. The feature of the subnet template is a subnet feature described in the subnet template. A subnet is an abstract concept. When a subnet template is used to deploy a subnet instance, the subnet herein is corresponding to the subnet instance, and a subnet feature is a feature of the subnet instance.

Specifically, the capability information of the subnet template includes at least one of the following: an identifier of the subnet template, a type of the subnet template, a function of the subnet template, a functional feature of the subnet template, a sharing policy of the subnet template, connection information of the subnet template, performance information of the subnet template, service information of the subnet template, and a configurable parameter of the subnet template.

The type of the subnet template is used to describe a type of the subnet. The function of the subnet template is used to describe a function of the subnet. The functional feature of the subnet template is used to describe a functional feature of the subnet. The sharing policy of the subnet template is used to describe a sharing policy of the subnet. The connection information of the subnet template is used to describe connection information of the subnet. The performance information of the subnet template is used to describe performance information of the subnet. The service information of the subnet template is used to describe service information of the subnet.

When a subnet instance is deployed based on the subnet template, the type of the subnet is the same as a type of the subnet instance, the function of the subnet is the same as a function of the subnet instance, the functional feature of the subnet is the same as a functional feature of the subnet instance, the sharing policy of the subnet is the same as a sharing policy of the subnet instance, the connection information of the subnet is the same as connection information of the subnet instance, the performance information of the subnet is the same as performance information of the subnet instance, and the service information of the subnet is the same as service information of the subnet instance.

Subnet templates may be classified in the following several manners: In an example, subnet templates may be classified based on network system types. Existing network systems mainly include a global system for mobile communications (GSM) system, a code division multiple access (CDMA) system, a wideband code division multiple access (WCDMA) system, a long term evolution (LTE) system, and a 5th generation (5G) system. The subnet templates may be classified into a GSM subnet template, a CDMA subnet template, a WCDMA subnet template, an LTE subnet template, or a 5G subnet template.

In another example, subnet templates may be classified based on network types. Each network system usually includes an AN subnet, a CN subnet, and a TN subnet. Correspondingly, a type of a subnet template may be a type such as AN, CN, or TN.

In still another example, subnet templates may be classified based on network system application scenarios. For example, in a 5G system, there are mainly the following three application scenarios: enhanced mobile broadband (eMBB), ultra-reliable and low latency communications (URLLC), and massive machine type communications (mMTC). Correspondingly, a type of a subnet template may be eMBB, URLL, mMTC, or the like.

In yet another example, subnet templates may be classified based on network system protocol architectures. For example, data is classified into control plane (CP) data and user plane (UP) data based on protocol architectures. Correspondingly, a type of a subnet template may be UP or CP.

In still yet another example, subnet templates may be classified with reference to any two or more of network system types, network types, network system application scenarios, and network system protocol architectures. For example, the subnet templates may be classified with reference to the network system protocol architectures, the network types, and the application scenarios. In this case, types of the subnet templates may be types such as (eMBB/URLLC/mMTC) AN CP, (eMBB/URLLC/mMTC) AN UP, (eMBB/URLLC/mMTC) CN CP, (eMBB/URLLC/mMTC) CN UP, (eMBB/URLLC/mMTC) TN CP, and (eMBB/URLLC/mMTC) TN UP.

The identifier of the subnet template is used to uniquely identify the subnet template. The identifier of the subnet template is not limited in this embodiment. The function of the subnet template is related to the type of the subnet template. Subnet functions described in different types of subnet templates are different. For example, a function of a CN subnet may include one or more of the following functions: database, domain name management system (DNS), mobility management (MM), session management (SM), security service, authentication, data packet scheduling processing (Packet process Scheduler), bearer service processing, network protocol processing, and the like. Functions of an AN subnet include radio resource management (RRM), packet data convergence protocol-signaling radio bearer (PDCP-SRB management, radio link control (RLC) processing, media access control (MAC) processing, internet protocol (IP) layer processing, data link layer radio link control (L2 RLC), data link layer media access control (L2 MAC), physical layer (L1 PHY) processing, and PDCP-data radio bearer (PDCP-DRB) management.

Optionally, a function may be optional, indicating that the function may be selected or may not be selected. For example, a mobility management function of an eMTC CN subnet template is optional. When an mMTC CN subnet is selected to instantiate a CN instance (Instance) to support a client metering service, this function does not need to be selected. When the mMTC CN subnet is selected to instantiate a CN instance to support data collection of a wearable device, this function is selected.

The functional feature of the subnet template is used to describe a value of the subnet feature described in the subnet template. For example, a feature of a mobility management function of a CN subnet may be low-speed mobility, normal mobility, high-speed mobility, or the like. For another example, SLA capability features supported by a subnet include a latency range (for example, 1 ms to 3 ms), a minimum value of a report success ratio, a minimum value of a command success ratio, a coverage size (for example, a diameter of a coverage area), a capacity, a value of a reliability parameter, a value of a throughput, and the like.

The sharing policy of the subnet template is used to describe whether the subnet described in the subnet template can be used to form only one network slice or can be used to form a plurality of network slices, which network slices can be formed by using the subnet described in the subnet template, and the like.

The connection information of the subnet template is used to describe a connection relationship between the subnet described in the subnet template and another subnet, an interface and a protocol that are used for connecting the subnet and the another subnet, and the like.

The performance information of the subnet template includes an SLA, quality of service (QoS), a key performance indicator (KPI), and the like of the subnet described in the subnet template.

The service information of the subnet template is information about a service supported by the subnet described in the subnet template. Each subnet may support one or more services, and services supported by different subnets may be the same or may be different. For example, some subnets support a voice service, some subnets support a virtual reality (VR) service, some subnets support a multimedia service, some subnets support an instant messaging service, and the like.

The configurable parameter of the subnet template is used to describe which capability information of the subnet described in the subnet template may be configured by a user. For the configurable parameter, the user may set and modify the parameter based on a requirement.

In this embodiment, the capability information of the subnet instance includes at least one of the following: an identifier of the subnet instance, a type of the subnet instance, a function of the subnet instance, a functional feature of the subnet instance, a sharing policy of the subnet instance, performance information of the subnet instance, connection information of the subnet instance, and service information of the subnet instance.

The subnet template and the subnet instance are both used to represent a subnet. The subnet instance is generated by using the subnet template. Therefore, for the same subnet, the type of the subnet instance is the same as the type of the subnet template, the function of the subnet instance is the same as the function of the subnet template, the functional feature of the subnet instance is the same as the functional feature of the subnet template, the sharing policy of the subnet instance is the same as the sharing policy of the subnet template, the performance information of the subnet instance is the same as the performance information of the subnet template, the connection information of the subnet instance is the same as the connection information of the subnet template, and the service information of the subnet instance is the same as the service information of the subnet template. However, the identifier of the subnet instance is different from the identifier of the subnet template. The identifier of the subnet instance is used to uniquely identify the subnet instance, and the identifier of the subnet template is used to uniquely identify the subnet. For other capability information of the subnet instance, refer to related descriptions of the foregoing capability information of the subnet template. Details are not described herein again.

It should be noted that, in this embodiment, the first manager may be a cross-domain slice manager, the second slice manager may be a domain slice manager, and a third manager may be a client slice manager. In this case, that a first manager obtains capability information of a subnet from a second manager is specifically: the first manager receives the capability information of the subnet from the second manager. Optionally, the first manager may alternatively be a client slice manager, and the second manager is a domain slice manager. In this case, that a first manager obtains capability information of a subnet from a second manager is specifically: the first manager receives the capability information of the subnet that is forwarded by the second manager by using a cross-domain slice manager. Optionally, the second manager may alternatively be a database. The database stores the capability information of the subnet.

Step 102: The first manager generates information about a network slice based on the capability information of the subnet, where the information about the network slice includes information about a network slice template or information about a network slice instance, and the network slice includes at least one subnet.

That the first manager generates information about a network slice based on the capability information of the subnet includes: the first manager designs the network slice template based on the capability information of the subnet, or the first manager orchestrates the network slice instance based on the capability information of the subnet. The information about the network slice template includes capability information of at least one subnet template or capability information of at least one subnet instance, and the information about the network slice instance includes capability information of at least one subnet template or capability information of at least one subnet instance.

The network slice template is used to deploy the network slice instance. Optionally, the information about the network slice template further includes at least one of the following information: indication information of the subnet instance, indication information of the subnet template, and a policy of resolution from the network slice corresponding to the network slice template to the subnet. The indication information of the subnet instance is used to indicate the subnet instance included in the network slice template, and the indication information of the subnet template is used to indicate the subnet template included in the network slice template. The resolution policy may be specifically a parameter mapping relationship between the network slice and the subnet. For example, a latency of a CN subnet is one fourth of that of a network slice, a latency of an AN subnet is one fourth of that of the network slice, a latency of a TN subnet is one half of that of the network slice, and the like.

The first manager may generate information about a plurality of network slice templates based on capability information of a plurality of subnets. Each network slice template can meet at least one service requirement. Each network slice template has some or all functions of a plurality of subnet slices used to generate the network slice template. When information about a network slice template is being generated, the first manager may generate the information about the network slice template based only on capability information of a subnet template, may generate the information about the network slice template based only on capability information of a subnet instance, or may generate the information about the network slice template based on both capability information of a subnet template and capability information of a subnet instance.

An example in which the first manager generates a network slice template based on subnet templates is used. Usually, a network includes an AN subnet, a CN subnet, and a TN subnet. Correspondingly, a network slice template also includes a combination of capability information of an AN subnet template, a CN subnet template, and a TN subnet template. It should be noted that when the first manager generates a network slice template, capability information of an AN subnet template, a CN subnet template, and a TN subnet template of a same network system may be selected and combined to generate the network slice template. For example, when an mMTC network slice template is generated, the mMTC network slice template is generated based on capability information of an AN subnet template, a CN subnet template, and a TN subnet template of mMTC; when a URLLC network slice template is generated, the URLLC network slice template is generated based on capability information of an AN subnet template, a CN subnet template, and a TN subnet template of URLLC. The first manager may alternatively select and combine capability information of an AN subnet template, a CN subnet template, and a TN subnet template of different network systems to generate a network slice template.

latencies: 7 ms for the AN, 5 ms for the CN, and 8 ms for the TN.

In the foregoing example, the first manager generates the network slice template mainly based on two functions of the AN subnet template, the CN subnet template, and the TN subnet template of mMTC: latencies and mobility management. Certainly, a network slice template may be generated alternatively based on other functions of the subnet templates, and the other functions are not listed one by one herein.

If the capability information of the foregoing plurality of subnet templates includes capability information of AN, TN, and CN CP subnet templates and capability information of RAN, TN, and CN UP subnet templates, that the first manager designs a network slice template based on capability information of the subnet templates or subnet instances may be: the first manager first generates an AN subnet template based on capability information of the AN CP subnet template and capability information of the AN UP subnet template, generates a CN subnet template based on capability information of the CN CP subnet template and capability information of the CN UP subnet template, and generates a TN subnet template based on capability information of the TN CP subnet template and capability information of the TN UP subnet template. Then, the first manager generates a network slice template based on capability information of the generated AN subnet template, CN subnet template, and TN subnet template. In another possible implementation, after generating the AN subnet template, the CN subnet template, and the TN subnet template, the first manager sends information about the AN subnet template, the CN subnet template, and the TN subnet template to the third manager. The third manager generates a network slice template based on the information about the AN subnet template, the CN subnet template, and the TN subnet template. When the first manager is a cross-domain slice manager, and the second manager is a domain slice manager, the third manager may be a client slice manager.

The foregoing mainly uses the example in which the first manager generates the information about the network slice template based on the capability information of the subnet templates, for description. The first manager may use the same method to generate information about a network slice template based on the capability information of the subnet instance, and details are not described herein again.

Optionally, the information about the network slice instance includes requirement information of a subnet instance required for instantiation or creation of the network slice instance. Before the first manager generates the information about the network slice instance based on the capability information of the subnet, the first manager may further receive requirement information of the network slice instance from the third manager, where the requirement information of the network slice instance is used for instantiation or creation of a network slice instance. The requirement information of the network slice instance may include at least one of the following information: a network slice type required by the network slice instance, an identifier of a network slice template required by the network slice instance, a quantity of users, an SLA, and the like. The first manager determines, based on the requirement information of the network slice instance and the capability information of the subnet, the requirement information of the subnet instance required for instantiation or creation of the network slice instance. Specifically, the first manager determines, in subnet templates or subnet instances based on the requirement information of the network slice instance and the capability information of the subnet, a subnet template or a subnet instance that can meet the requirement information of the network slice instance; and generates, based on the requirement information of the network slice instance and capability information of the subnet template or the subnet instance that meets the requirement information of the network slice instance, the requirement information of the subnet instance required for instantiation or creation of the network slice instance.

According to the method in this embodiment, the first manager obtains the capability information of the subnet, where the capability information of the subnet includes the at least one of the following information: the capability information of the subnet template and the capability information of the subnet instance, the capability information of the subnet template is used to represent the feature of the subnet template, and the capability information of the subnet instance is used to represent the feature of the subnet instance; and then generates the information about the network slice based on the capability information of the subnet, where the information about the network slice includes the information about the network slice template or the information about the network slice instance, and the network slice includes the at least one subnet. According to the method, the first manager can generate information about a plurality of network slices based on capability information of a plurality of subnets, to meet a plurality of service requirements. The generated network slices can be reused, and physical implementation of the network slices is shielded externally.

Figure 4:
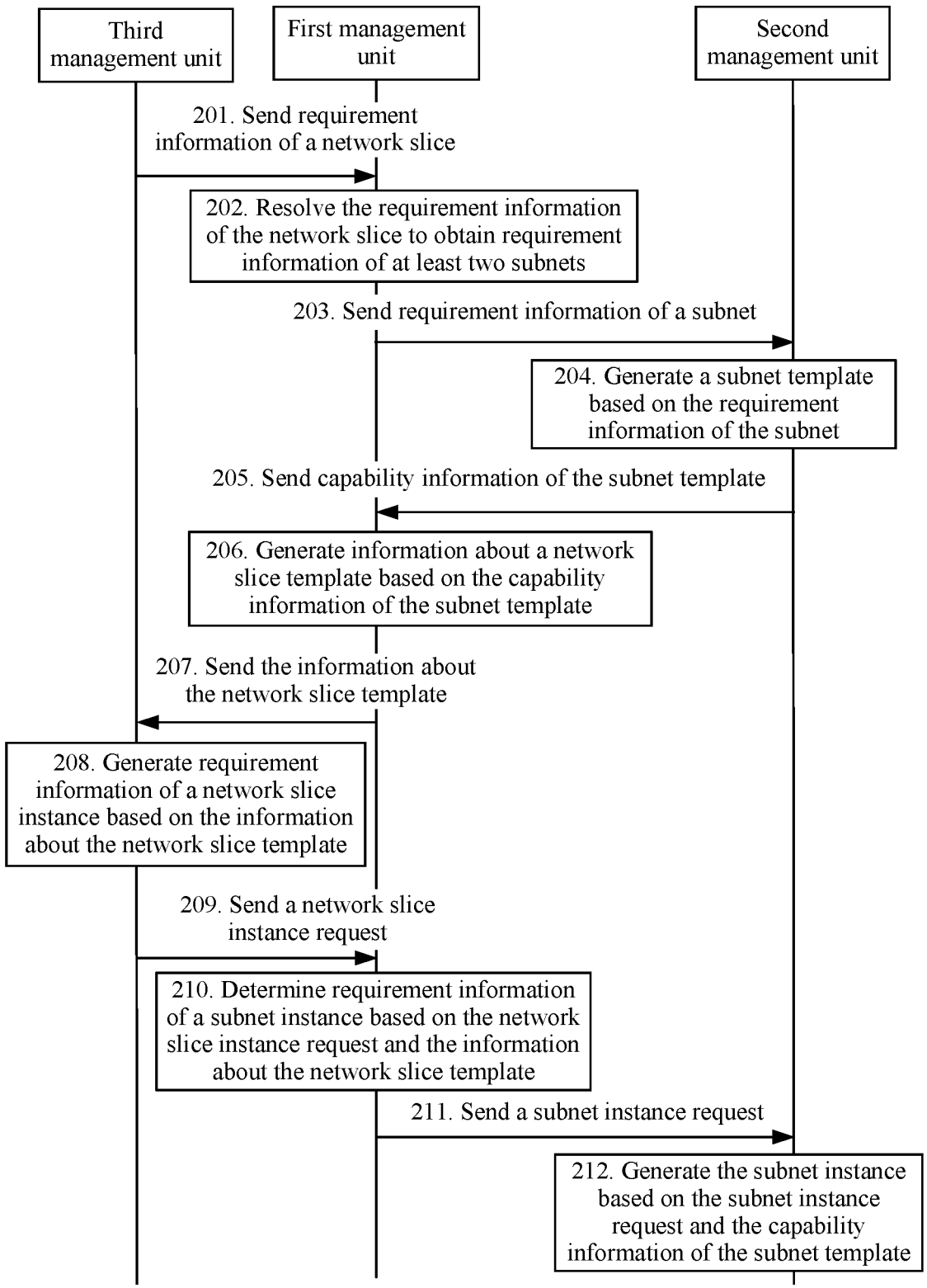
FIG. 4 is a signaling flowchart of a network slice management method according to Embodiment 2.

On a basis of Embodiment 1, FIG. 4 is a signaling flowchart of a network slice management method according to Embodiment 2. In this embodiment, the first manager may be a cross-domain slice manager, the second slice manager may be a domain slice manager, and the third manager may be a customer. As shown in FIG. 4, the method in this embodiment may include the following steps.

Step 201: The third manager sends requirement information of a network slice to the first manager.

The requirement information of the network slice includes a type of the network slice and a functional feature of the network slice. Types of network slices include a GSM network slice, a CDMA network slice, a WCDMA network slice, an LTE network slice, a 5G network slice, and the like. The 5G network slice may further include types such as an eMBB network slice, an mMTC network slice, and a URLLC network slice.

Step 202: The first manager resolves the requirement information of the network slice to obtain requirement information of at least two subnets.

Requirement information of the subnet includes a type of the subnet and a functional feature of the subnet. Specifically, the first manager first resolves the type of the network slice into at least two types of subnets based on the type of the network slice, and then the first manager performs resolution based on the functional feature of the network slice to obtain functional features of the subnets. For example, for a type of an eMBB network slice, the eMBB network slice is resolved into an eMBB RAN subnet, an eMBB CN subnet, and a TN CN subnet. Then, resolution is performed based on a functional feature of the eMBB network slice to obtain functional features of the eMBB RAN subnet, the eMBB CN subnet, and the TN CN subnet.

Step 203: The first manager sends requirement information of each subnet to a corresponding second manager.

FIG. 4 shows only one second manager. There are actually a plurality of second managers. The first manager sends the requirement information of each subnet to the corresponding second manager.

Step 204: The second manager generates a subnet template based on the requirement information of the subnet.

Specifically, the second manager generates the subnet template based on a network element or a function model in the subnet by using an overlapping coverage/capacity planning algorithm, a resource selection algorithm, a parameter mapping resolution capability, a model conversion capability, and the like.

It should be noted that steps 201 to 204 are optional steps. Steps 201 to 204 may be alternatively completed through manual negotiation, but a subnet template finally obtained through the negotiation needs to be loaded to the second manager.

Step 205: The second manager sends capability information of the generated subnet template to the first manager.

The capability information of the subnet template includes at least one of the following: an identifier of the subnet template, a type of the subnet template, a function of the subnet template, a functional feature of the subnet template, a sharing policy of the subnet template, connection information of the subnet template, performance information of the subnet template, service information of the subnet template, and a configurable parameter of the subnet template.

Step 206: The first manager generates information about a network slice template based on the capability information of the subnet template.

The information about the network slice template includes capability information of at least one subnet template or capability information of at least one subnet instance. The network slice template is used to deploy a network slice instance. For specific implementations of step 205 and step 206, refer to related descriptions in Embodiment 1. Details are not described herein again.

Step 207: The first manager sends the information about the network slice template to the third manager.

The information about the network slice template further includes at least one of the following information: indication information of the subnet instance, indication information of the subnet template, and a policy of resolution from the network slice corresponding to the network slice template to the subnet. The indication information of the subnet instance is used to indicate the subnet instance included in the network slice template, and the indication information of the subnet template is used to indicate the subnet template included in the network slice template.

The first manager may send all information of a plurality of generated network slice templates to the third manager. Optionally, before step 207, the third manager may send a network slice template query request to the first manager.

Step 208: The third manager determines requirement information of a network slice instance based on the received information about the network slice template.

The requirement information of the network slice instance may include at least one of the following information: a network slice type required by the network slice instance, an identifier of a network slice template required by the network slice instance, a quantity of users, an SLA, and the like.

Step 209: The third manager sends a network slice instance request to the first manager.

The network slice instance request includes the requirement information of the network slice instance.

Step 210: The first manager determines requirement information of a subnet instance based on the network slice instance request and the information about the network slice template.

The requirement information of the network slice instance is resolved into requirement information of at least two subnet instances. The requirement information of the subnet instance includes at least one of the following information: a type of the subnet instance, a function of the subnet instance, a functional feature of the subnet instance, an SLA of the subnet instance, and the like.

Step 211: The first manager sends a subnet instance request to the second manager.

The subnet instance request message includes the requirement information of the subnet instance. Because the requirement information of the network slice instance is resolved into the requirement information of the at least two subnet instances, the first manager needs to send subnet instance requests to at least two second managers. For example, an eMBB network slice is resolved into an eMBB RAN subnet instance, an eMBB CN subnet instance, and an eMBB TN subnet instance. In this case, the first manager sends subnet instance requests to three second managers, to request to obtain the eMBB RAN subnet instance, the eMBB CN subnet instance, and the eMBB TN subnet instance.

Step 212: The first manager generates the subnet instance based on the received subnet instance request and the capability information of the subnet template.

Specifically, the first manager converts the requirement information of the subnet instance into corresponding network element deployment information and configuration information based on the subnet instance request and the capability information of the subnet template.

According to the method in this embodiment, the first manager obtains the capability information of the subnet, generates the information about the network slice template based on the capability information of the subnet, and sends the information about the network slice template to the third manager, so that the third manager determines the requirement information of the network slice instance based on the information about the network slice template. According to the method, the first manager can generate information about a plurality of network slice templates based on capability information of a plurality of subnets, to meet a plurality of service requirements. The network slice templates can be reused, and physical implementation of network slices is shielded externally.

Figure 5:
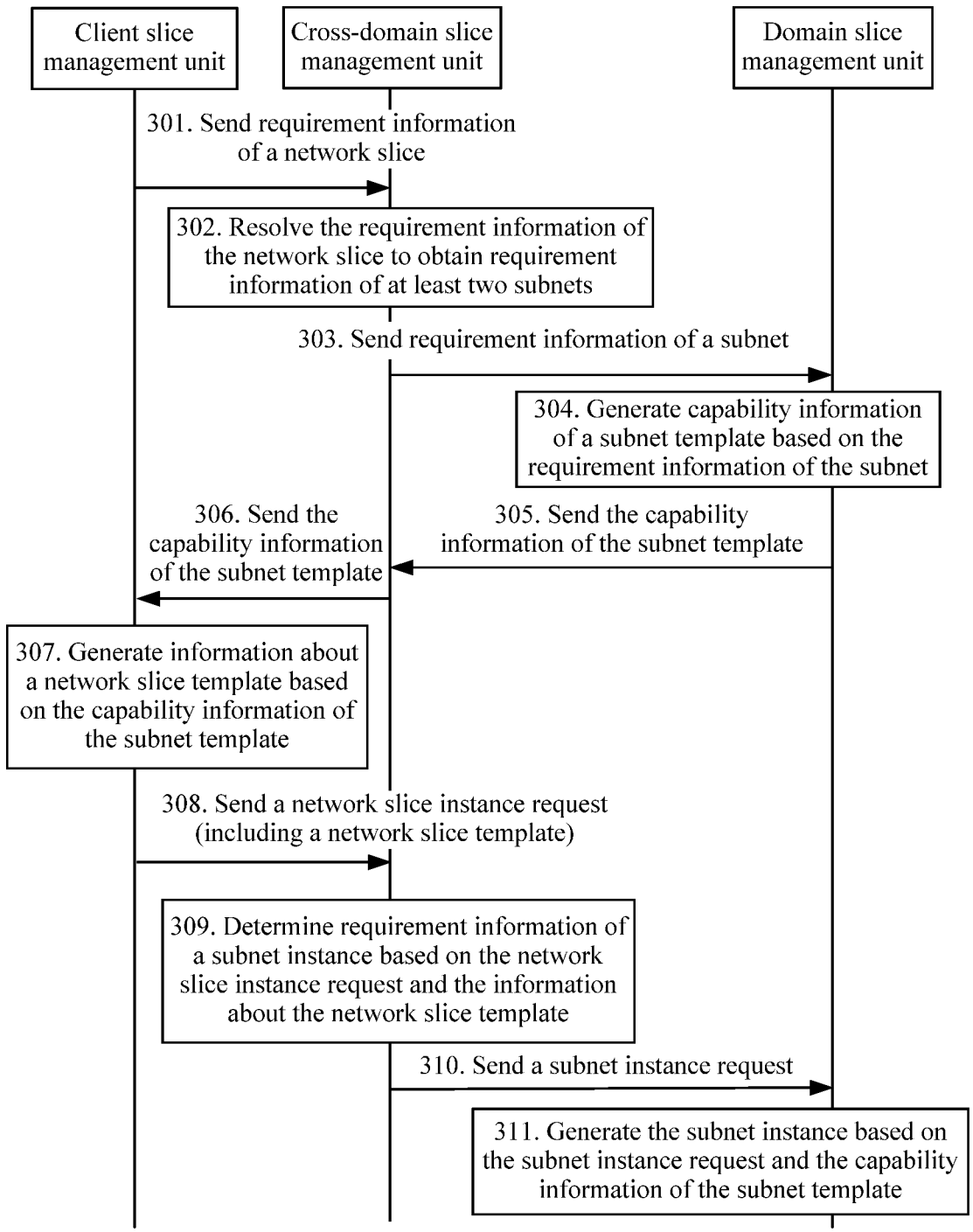
FIG. 5 is a signaling flowchart of a network slice management method according to Embodiment 3.

On a basis of Embodiment 1, Embodiment 3 provides a network slice management method. A difference between this embodiment and Embodiment 2 is that, in this embodiment, the first manager is a client slice manager, and the second manager is a domain slice manager. In this embodiment, a cross-domain slice manager forwards capability information of a subnet to the client slice manager after receiving the capability information of the subnet, and the client slice manager generates information about a network slice template based on the capability information of the subnet. FIG. 5 is a signaling flowchart of the network slice management method according to Embodiment 3. As shown in FIG. 5, the method in this embodiment may include the following steps.

Step 301: The client slice manager sends requirement information of a network slice to the cross-domain slice manager.

Step 302: The cross-domain slice manager resolves the requirement information of the network slice to obtain requirement information of at least two subnets.

Step 303: The cross-domain slice manager sends requirement information of each subnet to a corresponding domain slice manager.

Step 304: The domain slice manager generates capability information of a subnet template based on the requirement information of the subnet.

Step 305: The domain slice manager sends the generated capability information of the subnet template to the cross-domain slice manager.

Step 306: The cross-domain slice manager sends the capability information of the subnet template to the client slice manager.

Step 307: The client slice manager generates information about a network slice template based on the capability information of the subnet template.

Step 308: The client slice manager sends a network slice instance request to the cross-domain slice manager.

A difference from Embodiment 2 is that, in this embodiment, the network slice instance request includes requirement information of a network slice instance and information that is about a plurality of network slice templates and that is generated by the client slice manager.

Optionally, before step 308, the client slice manager may send a network slice template query request to the cross-domain slice manager.

In this embodiment, the client slice manager adds the information about the network slice templates to the network slice instance request. In another embodiment, the client slice manager may alternatively send a network slice template loading request to the cross-domain slice manager before step 308. The network slice template loading request is used to load the information about the plurality of network slice templates to the cross-domain slice manager. Correspondingly, the network slice instance request does not need to include the information about the plurality of network slice templates.

Step 309: The cross-domain slice manager determines requirement information of a subnet instance based on the requirement information of the network slice instance and the information about the network slice template.

Step 310: The cross-domain slice manager sends a subnet instance request to the domain slice manager.

The subnet instance request includes the requirement information of the subnet instance.

Step 311: The domain slice manager generates a subnet slice instance based on the received subnet instance request and the capability information of the subnet template.

Figure 6:
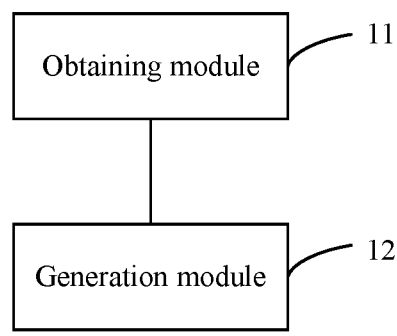
FIG. 6 is a schematic structural diagram of a network slice management apparatus according to Embodiment 4.

FIG. 6 is a schematic structural diagram of a network slice management apparatus according to Embodiment 4. As shown in FIG. 6, the network slice management apparatus in this embodiment includes an obtaining module 11 and a generation module 12.

The obtaining module 11 is configured to obtain capability information of a subnet from a second manager, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

The generation module 12 is configured to generate information about a network slice based on the capability information of the subnet, where the information about the network slice includes information about a network slice template or information about a network slice instance, and the network slice includes at least one subnet.

Optionally, the capability information of the subnet template includes at least one of the following: an identifier of the subnet template, a type of the subnet template, a function of the subnet template, a functional feature of the subnet template, a sharing policy of the subnet template, connection information of the subnet template, performance information of the subnet template, service information of the subnet template, and a configurable parameter of the subnet template.

Optionally, the capability information of the subnet instance includes at least one of the following: an identifier of the subnet instance, a type of the subnet instance, a function of the subnet instance, a functional feature of the subnet instance, a sharing policy of the subnet instance, performance information of the subnet instance, connection information of the subnet instance, and service information of the subnet instance.

Optionally, the information about the network slice template includes capability information of at least one subnet template or capability information of at least one subnet instance, and the information about the network slice instance includes capability information of at least one subnet template or capability information of at least one subnet instance.

Optionally, the information about the network slice template further includes at least one of the following information: indication information of the subnet instance, indication information of the subnet template, and a policy of resolution from the network slice corresponding to the network slice template to the subnet, the indication information of the subnet instance is used to indicate the subnet instance included in the network slice template, the indication information of the subnet template is used to indicate the subnet template included in the network slice template, and the network slice template is used to deploy the network slice instance.

Optionally, the information about the network slice includes the information about the network slice template. The apparatus further includes a sending module (not shown in the figure). The sending module is configured to send the information about the network slice template to a third manager.

Optionally, the information about the network slice instance includes requirement information of a subnet instance required for instantiation or creation of the network slice instance. The apparatus further includes a receiving module (not shown in the figure). The receiving module is configured to receive requirement information of the network slice instance from the third manager, where the requirement information of the network slice instance is used for instantiation or creation of a network slice instance. The generation module 12 is specifically configured to determine, based on the requirement information of the network slice instance and the capability information of the subnet, the requirement information of the subnet instance required for instantiation or creation of the network slice instance.

Optionally, the sending module is further configured to send a query request message to the second manager, where the query request message is used to request for the capability information of the subnet.

The apparatus in this embodiment may be configured to perform the steps that are performed by the first manager in the methods provided in Embodiment 1 to Embodiment 3. Specific implementations and technical effects are similar, and details are not described herein again.

Figure 7:
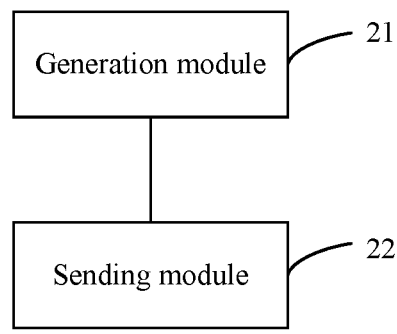
FIG. 7 is a schematic structural diagram of a network slice management apparatus according to Embodiment 5.

FIG. 7 is a schematic structural diagram of a network slice management apparatus according to Embodiment 5. As shown in FIG. 7, the network slice management apparatus in this embodiment includes a generation module 21 and a sending module 22.

The generation module 21 is configured to generate capability information of a subnet, where the capability information of the subnet includes at least one of the following information: capability information of a subnet template and capability information of a subnet instance, the capability information of the subnet template is used to represent a feature of the subnet template, and the capability information of the subnet instance is used to represent a feature of the subnet instance.

The sending module 22 is configured to send the capability information of the subnet to a first manager.

Optionally, the apparatus further includes a receiving module (not shown in the figure). The receiving module is configured to receive a query request message sent by the first manager, where the query request message is used to request for the capability information of the subnet.

Optionally, the capability information of the subnet template includes at least one of the following: an identifier of the subnet template, a type of the subnet template, a function of the subnet template, a functional feature of the subnet template, a sharing policy of the subnet template, connection information of the subnet template, performance information of the subnet template, service information of the subnet template, and a configurable parameter of the subnet template.

Optionally, the capability information of the subnet instance includes at least one of the following: an identifier of the subnet instance, a type of the subnet instance, a function of the subnet instance, a functional feature of the subnet instance, a sharing policy of the subnet instance, performance information of the subnet instance, connection information of the subnet instance, and service information of the subnet instance.

The apparatus in this embodiment may be configured to perform the steps that are performed by the second manager in the methods provided in Embodiment 1 to Embodiment 3. Specific implementations and technical effects are similar, and details are not described herein again.

It should be noted that, in the foregoing Embodiment 4 and Embodiment 5, the receiving module and the sending module may be implemented by a transceiver; or the receiving module is implemented by an independent receiver, and the sending module is implemented by an independent receiver. A processing module in the foregoing embodiments may be implemented by a processor with a data processing function.

Figure 8:
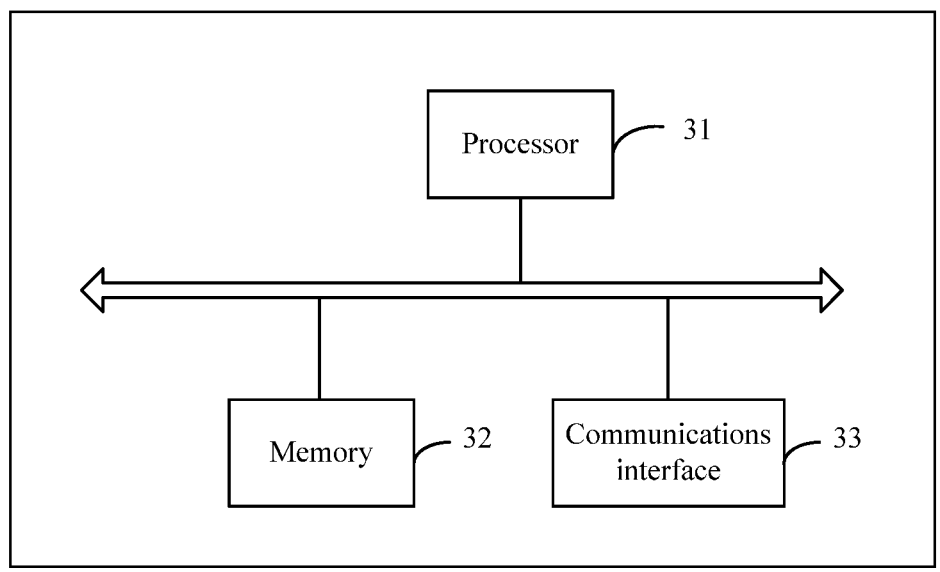
FIG. 8 is a schematic structural diagram of a network slice management apparatus according to Embodiment 6.

FIG. 8 is a schematic structural diagram of a network slice management apparatus according to Embodiment 6. As shown in FIG. 8, the network slice management apparatus provided in this embodiment includes a processor 31, a memory 32, and a communications interface 33. The memory 32 is configured to store an instruction; the communications interface 33 is configured to communicate with another device; and the processor 31 is configured to execute the instruction stored in the memory 32, so that the network slice management apparatus performs the steps that are performed by the first manager in the methods provided in Embodiment 1 to Embodiment 3. Specific implementations and technical effects are similar, and details are not described herein again.

Embodiment 7 provides a network slice management apparatus. A structure of the network slice management apparatus is the same as that of the apparatus shown in FIG. 8. The network slice management apparatus is configured to perform the steps that are performed by the second manager in the methods provided in Embodiment 1 to Embodiment 3. Specific implementations and technical effects are similar, and details are not described herein again.

Embodiment 8 provides a computer-readable storage medium. The computer-readable storage medium stores an instruction. When the instruction is executed, a computer is enabled to perform the steps that are performed by the first manager in the methods provided in Embodiment 1 to Embodiment 3. Specific implementations and technical effects are similar, and details are not described herein again.

Embodiment 9 provides a computer-readable storage medium. The computer-readable storage medium stores an instruction. When the instruction is executed, a computer is enabled to perform the steps that are performed by the second manager in the methods provided in Embodiment 1 to Embodiment 3. Specific implementations and technical effects are similar, and details are not described herein again.

Embodiment 10 provides a computer program product. The computer program product includes an instruction. When the instruction is executed, a computer is enabled to perform the steps that are performed by the first manager in the methods provided in Embodiment 1 to Embodiment 3. Specific implementations and technical effects are similar, and details are not described herein again.

Embodiment 11 provides a computer program product. The computer program product includes an instruction. When the instruction is executed, a computer is enabled to perform the steps that are performed by the second manager in the methods provided in Embodiment 1 to Embodiment 3. Specific implementations and technical effects are similar, and details are not described herein again.

It may be understood that the processor mentioned in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various examples of logical blocks, modules, and circuits described with reference to content disclosed in this application. Alternatively, the processor may be a combination for implementing a computing function, for example, a combination including one or more microprocessors, or a combination of a DSP and a microprocessor.

The bus mentioned in this application may be an industry standard architecture (ISA) bus, a peripheral component interconnect (PCI) bus, an extended industry standard architecture (EISA) bus, or the like. The bus may be classified into an address bus, a data bus, a control bus, or the like. For ease of representation, the bus in the accompanying drawings of this application is not limited to only one bus or only one type of bus.

The communications interface mentioned in this application may include an independent transmitter and an independent receiver, or may alternatively be an integration of a transmitter and a receiver. The communications interface may work under an instruction of a corresponding processor. Optionally, the transmitter may be corresponding to a transmitter in a physical device, and the receiver may be corresponding to a receiver in the physical device.

In addition, it should be understood that the module division of the foregoing network slice management apparatus is merely logical function division, and there may be another division manner during actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions in the embodiments.

In addition, functional units in this application may be integrated into one processing unit, or each of the units may exist alone physically, or two or more units may be integrated into one unit. The integrated unit may be implemented in a form of hardware, or may be implemented in a form of hardware and a software functional unit.

What is claimed is:

1. A method, comprising:
   receiving, by a first device from a third device, requirement information of a network slice;
   resolving, by the first device, the requirement information of the network slice to obtain requirement information of at least two subnets of the network slice;
   sending, by the first device, the requirement information of the at least two subnets to at least a second device;
   obtaining, by the first device, first capability information from the at least the second device based on the requirement information of the at least two subnets, wherein the first capability information comprises: capability information of a first subnet template or capability information of a first subnet instance, wherein the capability information of the first subnet template from the at least the second device represents function features of the first subnet template including latency and mobility management functions of the first subnet template, and the capability information of the first subnet instance from the at least the second device represents function features of the first subnet instance including latency and mobility management functions of the first subnet instance; and
   generating, by the first device, information about the network slice based on the first capability information, wherein the information about the network slice corresponds to the network slice and comprises information about a first network slice template or information about a first network slice instance, and the network slice comprises a first subnet and a second subnet of the at least two subnets.

2. The method according to claim 1, wherein the capability information of the first subnet template comprises:
   an identifier of the first subnet template, a type of the first subnet template, a function of the first subnet template, a functional feature of the first subnet template, a sharing policy of the first subnet template, connection information of the first subnet template, performance information of the first subnet template, service information of the first subnet template, or a configurable parameter of the first subnet template.

3. The method according to claim 1, wherein the capability information of the first subnet instance comprises:
an identifier of the first subnet instance, a type of the first subnet instance, a function of the first subnet instance, a functional feature of the first subnet instance, a sharing policy of the first subnet instance, performance information of the first subnet instance, connection information of the first subnet instance, or service information of the first subnet instance.

4. The method according to claim 1, wherein:
the information about the first network slice template comprises capability information of a second subnet template or capability information of a second subnet instance; and
the information about the first network slice instance comprises capability information of a third subnet template or capability information of a third subnet instance.

5. The method according to claim 1, wherein:
the information about the first network slice template comprises:
indication information of the first subnet instance, indication information of the first subnet template, or a policy of resolution from the network slice to the first subnet, the policy of resolution corresponding to the first network slice template; and
the indication information of the first subnet instance indicates the first subnet instance, the first subnet instance is comprised in the first network slice template, the indication information of the first subnet template indicates the first subnet template, the first subnet template is comprised in the first network slice template, and the first network slice template is used to deploy the first network slice instance.

6. The method according to claim 1, wherein the information about the network slice comprises the information about the first network slice template, and after generating, by the first device, the information about the network slice based on the first capability information, the method further comprises:
sending, by the first device, the information about the first network slice template to the third device.

7. The method according to claim 1, wherein the information about the first network slice instance comprises requirement information of a second subnet instance required for instantiation or creation of the first network slice instance, and before generating, by the first device, the information about the network slice based on the first capability information, the method further comprises:
receiving, by the first device, requirement information of the first network slice instance from the third device, wherein the requirement information of the first network slice instance is used for instantiation or creation of the first network slice instance; and
wherein generating, by the first device, the information about the network slice based on the first capability information comprises:
determining, by the first device based on the requirement information of the first network slice instance and the first capability information, the requirement information of the second subnet instance required for instantiation or creation of the first network slice instance.

8. The method according to claim 1, wherein before obtaining, by the first device, the first capability information from the second device, the method further comprises:

sending, by the first device, a query request message to the second device, wherein the query request message requests the first capability information.

9. An apparatus, comprising:
at least one processor;
a transceiver; and
a non-transitory computer-readable storage medium coupled to the at least one processor and storing programming instructions for execution by the at least one processor;
wherein the transceiver is configured to:
receive, from a third device, requirement information of a network slice;
send requirement information of at least two subnets to at least a second device;
obtain first capability information from the at least the second device based on the requirement information of at least two subnets, wherein the first capability information comprises: capability information of a first subnet template or capability information of a first subnet instance, and wherein the capability information of the first subnet template from the at least the second device represents function features of the first subnet template including latency and mobility management functions of the first subnet template, and the capability information of the first subnet instance from the at least the second device represents function features of the first subnet instance including latency and mobility management functions of the first subnet instance; and
wherein the programming instructions comprise instructions for:
resolve the requirement information of the network slice to obtain the requirement information of the at least two subnets of the network slice; and
generating information about the network slice based on the first capability information, wherein the information about the network slice corresponds to the network slice and comprises information about a first network slice template or information about a first network slice instance, and the network slice comprises a first subnet and a second subnet of the at least two subnets.

10. The apparatus according to claim 9, wherein the first capability information comprises:
an identifier of the first subnet template, a type of the first subnet template, a function of the first subnet template, a functional feature of the first subnet template, a sharing policy of the first subnet template, connection information of the first subnet template, performance information of the first subnet template, service information of the first subnet template, or a configurable parameter of the first subnet template.

11. The apparatus according to claim 9, wherein the capability information of the first subnet instance comprises:
an identifier of the first subnet instance, a type of the first subnet instance, a function of the first subnet instance, a functional feature of the first subnet instance, a sharing policy of the first subnet instance, performance information of the first subnet instance, connection information of the first subnet instance, or service information of the first subnet instance.

12. The apparatus according to claim 9, wherein:
the information about the first network slice template comprises capability information of a second subnet template or capability information of a second subnet instance; and the information about the first network slice instance comprises capability information of a third subnet template or capability information of a third subnet instance.

13. The apparatus according to claim 9, wherein:
the information about the first network slice template comprises:
indication information of the first subnet instance, indication information of the first subnet template, and a policy of resolution from the network slice to the first subnet, the policy of resolution corresponding to the first network slice template; and
the indication information of the first subnet instance indicates the first subnet instance, the first subnet instance is comprised in the first network slice template, the indication information of the first subnet template indicates the first subnet template, the first subnet template is comprised in the first network slice template, and the first network slice template is used to deploy the first network slice instance.

14. The apparatus according to claim 9, wherein:
the information about the network slice comprises the information about the first network slice template; and
the transceiver is further configured to send the information about the first network slice template to the third device.

15. The apparatus according to claim 9, wherein:
the information about the first network slice instance comprises requirement information of a second subnet instance required for instantiation or creation of the first network slice instance;
the transceiver is further configured to receive requirement information of the first network slice instance from the third device, wherein the requirement information of the first network slice instance is used for instantiation or creation of the first network slice instance; and
the programming instructions further include instructions for determining, based on the requirement information of the first network slice instance and the first capability information, the requirement information of the second subnet instance required for instantiation or creation of the first network slice instance.

16. The apparatus according to claim 9, wherein the transceiver is further configured to:
send a query request message to the second device, wherein the query request message requests the first capability information.

17. A system, comprising:
a first device; and
a second device;
wherein the second device is configured to:
receive first requirement information of requirement information of at least two subnets from the first device;
generate first capability information based on the first requirement information; and
send the first capability information to the first device, wherein the first capability information comprises: capability information of a first subnet template or capability information of a first subnet instance, and wherein the capability information of the first subnet template represents function features of the first subnet template including latency and mobility management functions of the first subnet template, and the capability information of the first subnet instance represents function features of the first subnet instance including latency and mobility management functions of the first subnet instance; and
wherein the first device is configured to:
receive, from a third device, requirement information of a network slice;
resolve the requirement information of the network slice to obtain requirement information of the at least two subnets of the network slice;
sending the requirement information of the at least two subnets to at least the second device;
receive the first capability information; and
generate information about the network slice based on the first capability information, wherein the information about the network slice corresponds to the network slice and comprises information about a first network slice template or information about a first network slice instance, and the network slice comprises a first subnet.

18. The system according to claim 17, wherein the first capability information comprises:
an identifier of the first subnet template, a type of the first subnet template, a function of the first subnet template, a functional feature of the first subnet template, a sharing policy of the first subnet template, connection information of the first subnet template, performance information of the first subnet template, service information of the first subnet template, and a configurable parameter of the first subnet template.

19. The system according to claim 17, wherein the capability information of the first subnet instance comprises:
an identifier of the first subnet instance, a type of the first subnet instance, a function of the first subnet instance, a functional feature of the first subnet instance, a sharing policy of the first subnet instance, performance information of the first subnet instance, connection information of the first subnet instance, and service information of the first subnet instance.

20. The system according to claim 17, wherein:
the information about the first network slice template comprises capability information of a second subnet template or capability information of a second subnet instance; and
the information about the first network slice instance comprises capability information of a third subnet template or capability information of a third subnet instance.

21. The method of claim 1, wherein the at least two subnets comprise an access network (AN) subnet, a core network (CN) subnet, and a transport network (TN) subnet, wherein the sending comprises:
sending, by the first device, requirement information of the AN subnet to the second device;
sending, by the first device, requirement information of the CN subnet to a fourth device different from the second device; and
sending, by the first device, requirement information of the TN subnet to a fifth device different from the second device and different from the fourth device, wherein the obtaining comprises:
obtaining, by the first device, capability information of an AN subnet template from the second device;
obtaining, by the first device, capability information of an CN subnet template from the fourth device; and
obtaining, by the first device, capability information of an TN subnet template from the fifth device, and wherein the generating comprises:

generating the information about the first network slice template based on function features of the AN subnet template including latency and mobility management functions of the AN subnet template, function features of the CN subnet template including latency and mobility management functions of the CN subnet template, and function features of the TN subnet template including latency and mobility management functions of the TN subnet template, and wherein the first subnet template is the AN subnet template.

* * * * *